United States Patent
Gaur et al.

(10) Patent No.: US 12,430,694 B2
(45) Date of Patent: Sep. 30, 2025

(54) ON-DEMAND PAYROLL SYSTEM AND INTERFACE

(71) Applicant: ADP, Inc., Roseland, NJ (US)

(72) Inventors: Anshuman Gaur, Parisppany, NJ (US); Yishan Zhang, Parsippany, NJ (US); Saunak Adhuria, Parisppany, NJ (US); Anju Sharma, Parisppany, NJ (US); Vanshaj Rana, Parisppany, NJ (US); Usha Akenapalli, Parisppany, NJ (US); Karla Matute, Florham Park, NJ (US); Yeshwanth Chandrasekhar, Parsippany, NJ (US); Sridhar Patlolla, Pune (IN); Vadim Metelitsa, Parsippany, NJ (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/118,114

(22) Filed: Mar. 6, 2023

(65) Prior Publication Data

US 2023/0281727 A1    Sep. 7, 2023

Related U.S. Application Data

(63) Continuation of application No. 16/812,981, filed on Mar. 9, 2020, now abandoned.

(51) Int. Cl.
*G06Q 40/00* (2023.01)
*G06N 20/00* (2019.01)
(Continued)

(52) U.S. Cl.
CPC ........... *G06Q 40/125* (2013.12); *G06N 20/00* (2019.01); *G06Q 10/067* (2013.01);
(Continued)

(58) Field of Classification Search
CPC .............. G06Q 40/125; G06Q 10/067; G06Q 10/1057; G06Q 10/1091; G06Q 20/405; G06Q 20/42
See application file for complete search history.

(56) References Cited

U.S. PATENT DOCUMENTS

| 8,751,338 B2 * | 6/2014 | Dombroski | ............ G06Q 40/02 705/30 |
| D825,580 S * | 8/2018 | Havaldar | ..................... D14/485 |

(Continued)

FOREIGN PATENT DOCUMENTS

CA        2380079 A1     8/2001

OTHER PUBLICATIONS

US Office Action issued in corresponding U.S. Appl. No. 16/812,981, dated Dec. 24, 2021 (16 pages).

(Continued)

*Primary Examiner* — Talia F Crawley
(74) *Attorney, Agent, or Firm* — Foley & Lardner LLP

(57) ABSTRACT

A method, apparatus, system, and computer program product for processing an on-demand payroll request. In one illustrative example, an on-demand payroll microservice receives a request for an unscheduled payroll to an employee. The on-demand payroll microservice retrieves payroll information for the employee from a first set of microservices. The on-demand payroll microservice submits the payroll information to a second set of microservices for payroll calculations. In response to the second set of microservices completing the payroll calculations, the on-demand payroll microservice retrieves the payroll calculations through the first set of microservices. The on-demand payroll microservice displays the payroll calculations. In response to receiving approval of the unscheduled payroll, the on-demand payroll microservice submits the payroll calculations to the second set of microservices for payroll (Continued)

processing. In response to the second set of microservices completing the payroll processing, the on-demand payroll microservice displays a confirmation of the payroll processing.

20 Claims, 13 Drawing Sheets

(51) Int. Cl.
*G06Q 10/067* (2023.01)
*G06Q 10/1057* (2023.01)
*G06Q 10/1091* (2023.01)
*G06Q 20/40* (2012.01)
*G06Q 20/42* (2012.01)
*G06Q 40/12* (2023.01)

(52) U.S. Cl.
CPC ..... *G06Q 10/1057* (2013.01); *G06Q 10/1091* (2013.01); *G06Q 20/405* (2013.01); *G06Q 20/42* (2013.01)

(56) References Cited

U.S. PATENT DOCUMENTS

| | | | | |
|---|---|---|---|---|
| 11,271,938 | B1 * | 3/2022 | Thummisi | H04L 63/10 |
| 2002/0184148 | A1 * | 12/2002 | Kahn | G06Q 40/02 |
| | | | | 705/40 |
| 2011/0082778 | A1 * | 4/2011 | Dombroski | G06Q 40/125 |
| | | | | 705/32 |
| 2016/0026981 | A1 * | 1/2016 | Collins | G06Q 40/12 |
| | | | | 705/40 |
| 2016/0127454 | A1 * | 5/2016 | Maheshwari | H04L 67/10 |
| | | | | 709/223 |
| 2017/0323396 | A1 * | 11/2017 | Plotko | G06Q 40/125 |
| 2019/0385241 | A1 * | 12/2019 | Newman | G06Q 40/08 |
| 2020/0097916 | A1 * | 3/2020 | Hackert | G06Q 20/28 |
| 2020/0358876 | A1 * | 11/2020 | Kulkarni | G06F 9/5072 |
| 2021/0004915 | A1 * | 1/2021 | Schrage | G06Q 40/125 |
| 2021/0279816 | A1 * | 9/2021 | Gaur | G06Q 20/102 |

OTHER PUBLICATIONS

US Office Action issued in corresponding U.S. Appl. No. 16/812,981, dated Jul. 27, 2022 (26 pages).
US Office Action issued in corresponding U.S. Appl. No. 16/812,981, dated Jun. 6, 2022 (18 pages).
US Office Action issued in corresponding U.S. Appl. No. 16/812,981, dated Oct. 6, 2022 (15 pages).

* cited by examiner

FIG. 6

| | | | | | | | |
|---|---|---|---|---|---|---|---|
| ADP | ✉ MESSAGES | 📅 CALENDAR | Ⓑ BRIDGE | ❓ SUPPORT | ⤴ LOG OUT | (AW) | A WSPDVJ018 ⌄ |

HOME  RESOURCES  MYSELF  PEOPLE  PROCESS  REPORTS  SETUP  ☆    🔍 Search Workforce Now Pay Anytime ❓                                                                Add to Favorites ☆

| (AA) Andrew Anderson | Position 331000001 | Pay Type Other | Pay Period Aug 17, 2019-Aug 23, 2019 | Pay Date Fri Aug 16, 2019 |
|---|---|---|---|---|

EARNINGS (1) ▼       TOTAL EARNINGS    $1,100.00

| ($) Reg Pay ▶ | Hours 40.00 | × | Hourly Rate $27.50 | $1,100.00 | 🗑 |

(+) ADD EARNINGS

Gross to Net Summary

Earnings    $1,137.50

FRINGE BENEFITS (1) ▼     TOTAL FRINGE BENEFITS    $37.50

Deductions    $714.00

| 🎁 AOV Txble Award ▶ | Reportable Benefit 37.50 | $37.50 | 🗑 |

Taxes    $207.21

(+) ADD FRINGE BENEFITS

Net Pay    $178.79

DEDUCTIONS (12) ▼     TOTAL DEDUCTIONS    $705.07

| 🤝 Co Loan PreCalc ▶ | Interest 11.39 | + | Principal $125.50 | $136.89 | 🗑 |
| 📊 401k Trd | Base Percent 6.00 | | | $66.00 | 🗑 |
| 📊 401k Loan | Base Amount 73.85 | | | $73.85 | 🗑 |
| 🎁 Donation ▶ | Amount 25.00 | | | $25.00 | 🗑 |
| 💵 FSA Pre ▶ | Admin Fee 0.00 | + | Amount $25.00 | $25.00 | 🗑 |
| ♥ Medical ▶ | Admin Fee 0.00 | + | Amount $113.78 | $113.78 | 🗑 |

Gross to Net Summary

Earnings    $1,137.50

Deductions    $714.00

Taxes    $207.21

Net Pay    $178.79

FROM FIG. 7A

| | | Admin Fee | Amount | | |
|---|---|---|---|---|---|
| ♡ | Dental Pre ▶ | 0.00 + | $29.46 | $29.46 | 🗑 |
| ♡ | Perscription ▶ | Admin Fee 0.00 + | Amount $2.86 | $2.86 | 🗑 |
| ♡ | Vision ▶ | Admin Fee 0.00 + | Amount $11.86 | $11.86 | 🗑 |
| ⚙ | Stock Purchase | | Amount 168.49 | $168.49 | 🗑 |
| 🌱 | GTL Pre | | Amount 1.88 | $1.88 | 🗑 |
| ♿ | LTD Pre ▶ | | Amount 50.00 | $50.00 | 🗑 |

(+) ADD DEDUCTIONS

GARNISHMENTS (2) ▼     TOTAL GARNISHMENTS  $8.93

| 🎓 | Student Loan | Amount 1% | | $8.93 |
| 👶 | Child Support | Amount $175.00 | Dependent Medical Insurance Premium $35.00 | $0.00 |

⟳ Gross to Net Summary

Earnings    $1,137.50
Deductions  $714.00
Taxes       $207.21
Net Pay     $178.79

FROM FIG. 7B

| Tax Parameters ▼ | TOTAL TAX PARAMETERS $207.21 | |
|---|---|---|
| 🏛 Federal Tax ▼ | | $160.70 |
| ✓ Subject to Federal Income Tax | Filing as Single 1 allowance(s) | $86.42 |
| ✓ Subject to Social Security | | $60.20 |
| ✓ Subject to Medicare | | $14.08 |
| ✓ Subject to FUTA | | $0.00 |
| $ Primary Work Location - Alabama ▼ | | $46.51 |
| ✓ Subject to State Income Tax | Filing as Single | $36.80 |
| ✓ Subject to SUI | | $0.00 |
| ✓ Subject to Birmingham | | $9.71 |

Gross to Net Summary

Earnings $1,137.50
Deductions $714.00
Taxes $207.21
Net Pay $178.79

How should we tax supplemental wages in this pay?

Aggregate ⌄

Do you want to suspend Andrew's regular pay?
You can suspend regular pay if you do not want employee to get regular pay for the next pay period Aug 17, 2019 - Aug 23, 2019

Do not suspend ⌄

← GO BACK        CANCEL   SAVE & EXIT 💾   CONTINUE ⇨

FIG. 7C

| | | | | | | | |
|---|---|---|---|---|---|---|---|
| ADP | ✉ MESSAGES | 📅 CALENDAR | Ⓑ BRIDGE | ❓ SUPPORT | ⤴ LOG OUT | (AW) | A WSPDVJ018 ⌄ |

HOME  RESOURCES  MYSELF  PEOPLE  PROCESS  REPORTS  SETUP  ☆       🔍 Search Workforce Now Pay Anytime  (?)                                                   Add to Favorites  ☆

| (AA) Andrew Anderson | Position<br>331000001 | Pay Type<br>Other | Pay Period<br>Aug 17, 2019-Aug 23, 2019 | Pay Date<br>Fri Aug 16, 2019 |
|---|---|---|---|---|

Review & Approve Payment for Andrew Anderson
Once confirmed, we will process this payment

Payment Info  ✏

- Pay Type - Other
- Pay Processed - Pay Now
- Payment Method - Employee's Default Method (ADP Check will be issued)

Pay Preview  ✏

| Gross Pay | $1,100.00 |
|---|---|
| Regular | $1,100.00 |
| Deductions | $714.00 |
| 401(k) Base Contribution | $66.00 |
| Charitable Contribution | $25.00 |
| Stock Purchase Plan | $168.49 |
| Loan Principal Repayment | $125.50 |
| Loan Interest | $11.39 |
| 401(k) Loan | $73.85 |
| Prescription | $2.86 |
| LTD | $50.00 |
| GTL Employee Contribution | $1.88 |
| Dental | $29.46 |
| Vision | $11.86 |
| Medical | $113.78 |
| Health FSA | $25.00 |
| Student Loan | $8.93 |

FROM FIG. 8A

| Taxes | $207.21 |
|---|---|
| Federal Income Tax | $86.42 |
| Social Security | $60.20 |
| Medicare | $14.08 |
| State Income Tax - AL | $36.80 |
| Local Income Tax - Birmingham - AL | $9.71 |
| Net Pay | $178.79 |
| TOTAL | $178.79 |

Employer Contribution

| | |
|---|---|
| Social Security | $60.20 |
| Medicare | $14.08 |
| Federal Unemployment Insurance Tax | $0.00 |
| State Unemployment Insurance Tax Organization Contribution - AL | $0.00 |
| Er 401(k) Base Match | $1.65 |
| LTD Er Contribution | $25.00 |
| Dental - Er Contribution | $23.80 |
| Medical - Er Contribution | $113.78 |
| Health FSA - Er Contribution | $10.00 |
| Total Employer Contribution | $248.51 |

Reportable Benefits

| | |
|---|---|
| Taxable Vehicle Maintenance | $37.50 |
| Loan Imputed Income | $68.45 |
| Total Reportable Benefits | $105.95 |

⇦ GO BACK    (CANCEL)    (SAVE & EXIT 💾)    (APPROVE PAYMENT ⇨)

FIG. 8B

ON-DEMAND PAYROLL SYSTEM AND INTERFACE

CROSS-REFERENCE TO RELATED APPLICATIONS

This application claims priority and benefit under 35 U.S.C. § 120 as a continuation of U.S. Ser. No. 16/812,981, filed Mar. 9, 2020, the contents of which are is hereby incorporated by reference herein in its entirety.

BACKGROUND

1. Field

The present disclosure relates generally to an improved data processing system. In particular, the present disclosure relates to a method and apparatus for processing an on-demand payroll request within an organization. Still more particularly, the present disclosure relates to a method and apparatus for a graphical user interface used in visualizing and managing on-demand payments for employees of an organization.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization.

Every employer is faced with the regular generation of payroll for its employees. Initially, payroll processing was an arduous manual task, requiring the responsible individual to compute the base pay, applicable taxes, and other deductions for each of the employer's employees. Initially, these calculations were performed by hand. Later, these calculations were performed with the assistance of adding machines, calculators, and, finally, computers. Over time, automated systems have been developed to calculate pay, produce payroll checks, and even to make the automatic payroll deposits into an employee's bank account for employees participating in a direct deposit program.

Current payroll systems operate on a set payroll schedule, paying out compensation to employees on predetermined paydays. Employees may sometimes require cash in between payment periods for emergencies or during certain times of the year, such as holidays, and may not be able to wait until the end of the pay period. Current payroll systems require a human resources department to respond to requests for certain payroll events.

SUMMARY

According to an embodiment of the present invention, a method is provided for processing an on-demand payroll request. An on-demand payroll microservice receives a request for an unscheduled payroll to an employee. The on-demand payroll microservice retrieves payroll information for the employee from a first set of microservices. The on-demand payroll microservice submits the payroll information to a second set of microservices for payroll calculations. In response to the second set of microservices completing the payroll calculations, the on-demand payroll microservice retrieves the payroll calculations through the first set of microservices. The on-demand payroll microservice displays the payroll calculations. In response to receiving approval of the unscheduled payroll, the on-demand payroll microservice submits the payroll calculations to the second set of microservices for payroll processing. In response to the second set of microservices completing the payroll processing, the on-demand payroll microservice displays a confirmation of the payroll processing.

According to another embodiment of the present invention, an on-demand payroll system comprises a computer system for processing an on-demand payroll request. The computer system receives a request for an unscheduled payroll to an employee. The on-demand payroll microservice retrieves payroll information for the employee from a first set of microservices. The computer system submits the payroll information to a second set of microservices for payroll calculations. In response to the second set of microservices completing the payroll calculations, the computer system retrieves the payroll calculations through the first set of microservices. The computer system displays the payroll calculations. In response to receiving approval of the unscheduled payroll, the computer system submits the payroll calculations to the second set of microservices for payroll processing. In response to the second set of microservices completing the payroll processing, the computer system displays a confirmation of the payroll processing.

According to yet another embodiment of the present invention, a computer program product is provided for processing an on-demand payroll request. The computer program product comprises a computer-readable storage media and program code, stored on the computer-readable storage media, that is executable by a computer system. The program code includes code for receiving a request for an unscheduled payroll to an employee. The program code includes code for retrieving payroll information for the employee from a first set of microservices. The program code includes code for submitting the payroll information to a second set of microservices for payroll calculations. The program code includes code for retrieving the payroll calculations through the first set of microservices in response to the second set of microservices completing the payroll calculations. The program code includes code for displaying the payroll calculations. The program code includes code for submitting the payroll calculations to the second set of microservices for payroll processing in response to receiving approval of the unscheduled payroll. The program code includes code for displaying a confirmation of the payroll processing in response to the second set of microservices completing the payroll processing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is a second page of a graphical user interface for requesting an unscheduled payroll payment depicted in accordance with an illustrative embodiment;

FIGS. 7A-7C are a third page of a graphical user interface for requesting an unscheduled payroll payment in accordance with an illustrative embodiment;

FIGS. 8A-8B are a fourth page of a graphical user interface for requesting an unscheduled payroll payment in accordance with an illustrative embodiment;

DETAILED DESCRIPTION

Figure 1:
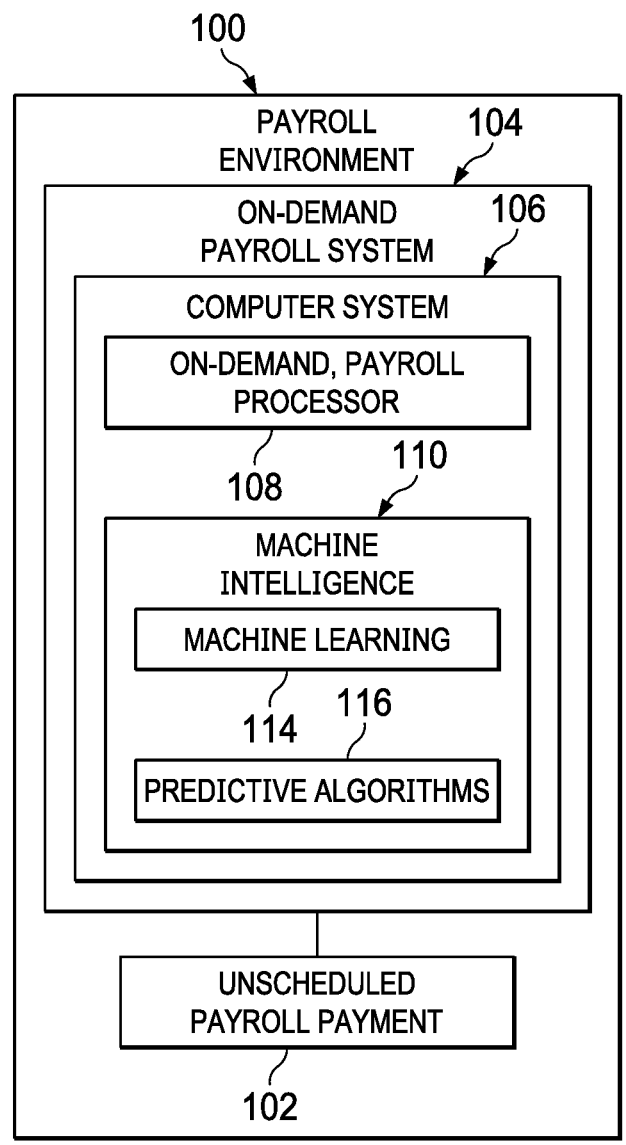
FIG. 1 is a block diagram of a payroll environment in accordance with an illustrative embodiment.

The illustrative embodiments recognize and take into account a number of different considerations. For example, the illustrative embodiments recognize and take into account that most of the traditional payroll systems are batch-based systems that are limited to processing a group of employees with a predefined payroll schedule. The illustrative embodiments recognize and take into account that traditional batch-based payroll systems are not capable of providing real-time payroll calculation. The illustrative embodiments recognize and take into account that traditional batch-based payroll systems do not enable faster payment processing of unscheduled payroll payments.

The illustrative embodiments also recognize and take into account that current that an on-demand pay may be needed for different reasons, such as bonus, commission, final pay, and adjustment. The illustrative embodiments also recognize and take into account that each type of on-demand payments can trigger different payroll policies and manual setup of processing rules to implement those policies may be more difficult than desired. Traditional payroll systems do not allow compliant tax deposits and garnishment settlements when processing on-demand payments, hence making difficult to ensure that only appropriate deductions are applied.

Therefore, it would be desirable to have a method, apparatus, system, and computer program product that take into account at least some of the issues discussed above, as well as other possible issues. For example, it would be desirable to have a method and apparatus that overcome an issue with providing on-demand payroll payment to an employee anytime without waiting for the regular scheduled payroll to be run.

Thus, illustrative embodiments provide a method, apparatus, system, and computer program product that processes an on-demand payroll request. In one illustrative example, an on-demand payroll microservice receives a request for an unscheduled payroll to an employee. The on-demand payroll microservice retrieves payroll information for the employee from a first set of microservices. The on-demand payroll microservice submits the payroll information to a second set of microservices for payroll calculations. In response to the second set of microservices completing the payroll calculations, the on-demand payroll microservice retrieves the payroll calculations through the first set of microservices. The on-demand payroll microservice displays the payroll calculations. In response to receiving approval of the unscheduled payroll, the on-demand payroll microservice submits the payroll calculations to the second set of microservices for payroll processing. In response to the second set of microservices completing the payroll processing, the on-demand payroll microservice displays a confirmation of the payroll processing.

As used herein, a "set of," when used with reference to items means one or more items. For example, a "set of criteria" is one or more criteria. As used herein, "a number of," when used with reference to items, means one or more items.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to the figures and, in particular, with reference to FIG. 1, a block diagram of a payroll environment is depicted in accordance with an illustrative embodiment. In this illustrative example, forecast environment 100 is an environment in which unscheduled payroll payments are processed for an employee of an organization. In this illustrative example payroll system 104 operates to provide unscheduled payroll payment 102.

As depicted, on-demand payroll system 104 comprises computer system 106 and on-demand payroll processor 108. On-demand payroll processor 108 is located in computer system 106.

Computer system 106 is a physical hardware system and includes one or more data processing systems. The data processing systems can be selected from at least one of a computer, a server computer, a tablet computer, or some other suitable data processing system. When more than one data processing system is present in computer system 106, those data processing systems are in communication with each other using a communications medium. The communications medium can be a network.

On-demand payroll processor 108 can be implemented in software, hardware, firmware, or a combination thereof. When software is used, the operations performed by on-demand payroll processor 108 can be implemented in program code configured to run on hardware, such as a processor unit. When firmware is used, the operations performed by on-demand payroll processor 108 can be implemented in program code and data and stored in persistent memory to run on a processor unit. When hardware is employed, the hardware may include circuits that operate to perform the operations in on-demand payroll processor 108.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In the illustrative example, on-demand payroll processor 108 in computer system 106 operates to process on-demand payroll requests.

In one illustrative example, one or more solutions are present that overcome an issue with providing on-demand payroll payment to an employee anytime without waiting for the regular scheduled payroll to be run. As a result, one or more solutions may provide an effect of enabling the faster payment processing of unscheduled payroll payments as compared to current techniques of traditional batch-based payroll systems. Thus, the illustrative examples can provide real-time payroll calculation that take into account different payroll policies that can be implicated by different types of on-demand payments and the processing rules to implement those policies.

Computer system 106 can be configured to perform at least one of the steps, operations, or actions described in the different illustrative examples using software, hardware, firmware, or a combination thereof. As a result, computer system 106 operates as a special purpose computer system in which on-demand payroll processor 108 in computer system 106 enables the faster payment processing of unscheduled payroll payments as compared to current techniques of traditional batch-based payroll systems. In particular, on-demand payroll processor 108 transforms computer system 106 into a special purpose computer system as compared to currently available general computer systems that do not have on-demand payroll processor 108.

Computer system 106 can comprise machine intelligence 110 and indexing program 112. Machine intelligence 110 comprises machine learning 114 and predictive algorithms 116.

Machine intelligence 110 can be implemented using one or more systems such as an artificial intelligence system, a neural network, a wide-and-deep model network, a Bayesian network, an expert system, a fuzzy logic system, a genetic algorithm, or other suitable types of systems. Machine learning 114 and predictive algorithms 116 may make computer system 106 a special purpose computer for dynamic predictive modelling of unscheduled payroll payments and the payroll policies applied thereto.

Machine learning 114 can be supervised machine learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

Machine learning 114 can be unsupervised machine learning. If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Figure 2:
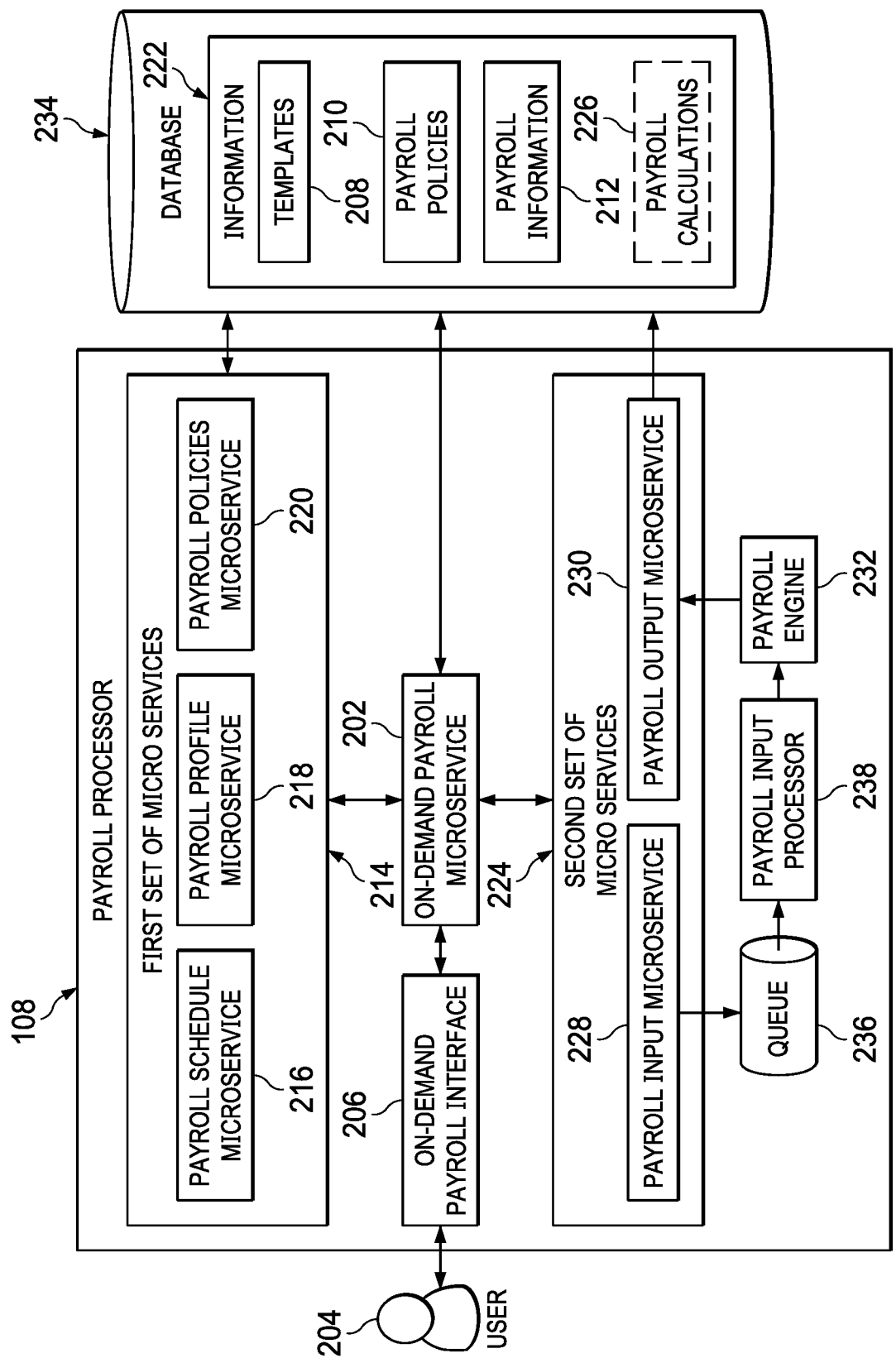
FIG. 2 is a block diagram of a payroll processor implemented in a microservice architecture in accordance with an illustrative embodiment.

With reference now to FIG. 2, a block diagram of a payroll processor implemented in a microservice architecture is depicted in accordance with an illustrative embodiment. One or more microservices are used to implement on-demand payroll processor 108 of FIG. 1.

A microservice architecture is a method of developing software applications as a suite of independently deployable, small, modular services in which each microservice runs a unique process and communicates through a well-defined, lightweight mechanism to serve a business goal. These microservices can be deployed, modified, and then redeployed independently without compromising the integrity of an application. Microservices receive requests, process them, and generate a response accordingly. When change is required in a certain part of the application, only the corresponding microservice needs to be modified and redeployed. In other words, there is no need to modify and redeploy the entire application. Also, if one microservice fails, the other microservices in the microservice architecture will continue to work.

In the illustrative example, on-demand payroll microservice 202 receives a request for an unscheduled payment to an employee. As depicted user 204 interacts with on-demand payroll microservice 202 through user input to on-demand payroll interface 206 using one or more user input devices, such as a keyboard, a mouse, a graphical user interface (a physical display), a touch screen, a voice interaction, and any other suitable interface for interacting with the computer.

User 204 can be associated with an organization that employs the employee. In one example, user 204 interacts with on-demand payroll microservice 202 to request an unscheduled payment be issued to himself. In one example, user 204 can interact with on-demand payroll microservice 202 to request or approve an unscheduled payment to be issued to another employee of the organization.

On-demand payroll interface 206 a front-end application that facilitates interaction between user 204 and on-demand payroll microservice 202. On-demand payroll interface 206 can include a graphical user interface displayed on a display system. A display device in display system. The display system can be a group of display devices selected from one of a liquid crystal display (LCD), a light emitting diode (LED) display, an organic light emitting diode (OLED) display, and other suitable types of display devices.

In conjunction with the request for the unscheduled payment, on-demand payroll microservice 202 can receive a selection of one of templates 208 for the unscheduled payment. Templates 208 are frameworks for implementing payroll policies 210 in a payroll processing system. Payroll policies 210 represent payroll features that may be implemented by organizations in running a payroll. For example, payroll policies 210 may include, for example, retirement savings, 501(k) employer matches, tax withholdings, reimbursements, reporting, vacation time, health insurance, wage garnishments, and other suitable policies that are used by organizations in running a payroll.

Templates 208 can include one or more templates for processing a payroll request, according to the associated unscheduled payment. For example, templates 208 can include, but are not limited to, a bonus payment template, a payment upon termination template, a payment upon leave of absence template, and adjusted regular payment template, a back payment template, an additional payment template, a commission payment template, and other suitable templates.

Each of templates 208 can implement one or more different ones of payroll policies 210. In this manner, by selecting different ones of templates 208, one or more different ones of payroll policies 210 can be applied when processing an unscheduled payment. Additionally, each of templates 208 can implement payroll policies 210 for the unscheduled payment that are different than payroll policies implemented for regular payroll payments processed according to a regular payroll schedule.

In the illustrative example, on-demand payroll microservice 202 retrieves payroll information 212 for the employee from a first set of microservices 214. First set of microservices 214 includes one or more micro services for managing information 222. This management of information 222 may include at least one of writing, modifying, deleting, distributing, partitioning, sharing, assigning ownership, accessing, or otherwise manipulating information 222. As depicted, first set of microservices 214 includes a payroll schedule microservice 216, a payroll profile microservice 218, and a payroll policies microservice 220.

For example, On-demand payroll interface 206 instructs on-demand payroll microservice 202 to GET data from various REST micro services, such as first set of microservices 214. On-demand payroll microservice 202 uses this data to populate data fields within a selected one of templates 208, such as earnings, deductions, fringe benefits, etc.

In the illustrative example, on-demand payroll microservice 202 submits the payroll information to second set of microservices 224 for payroll calculations 226. Second set of microservices 224 includes one or more micro services for generating payroll calculations 226. As depicted, second set of microservices 224 includes payroll input microservice 228 and payroll output microservice 230.

According to one illustrative example, second set of microservices 224 provides payroll calculations 226 by interfacing with payroll engine 232. Payroll engine 232 may be implemented as part of a batch-based payroll system that is used to run batch-based payroll according to a predefined payroll schedule for organizations. Second set of microservices 224 queues payroll information received from on-demand payroll micro service 202 for determination of payroll calculations 226 by payroll engine 232. Payroll engine 232 receives the payroll information as payroll input processor 234, and processes the payroll information according to indicated ones of payroll policies 210. Payroll engine 232 returns payroll calculations 226 to second set of micro services 224 for storage.

For example, after populating various data fields in the selected one of templates 208, on-demand payroll microservice 202 creates a record of the request, including an object identifier for the request. The request can be stored in a database, such as database 234. On-demand payroll microservice 202 makes a REST call is made to payroll input microservice 228. Payroll input microservice 228 puts a message, including the payroll information, into the queue 236. In response, payroll input processor 238 requests payroll engine 232 to perform payroll calculations 226 for the payroll information.

Once payroll engine 232 completes processing, payroll calculations 226 are POSTed to payroll output microservice 230. Payroll output microservice 230 saves payroll calculations 226 in database 234. Payroll output microservice 230 updates Payroll input microservice 228 with the completed job status.

In the illustrative example, in response to the second set of microservices completing the payroll calculations, on-demand payroll microservice 202 retrieves the payroll calculations 226 through first set of micro services 214. On-demand payroll microservice 202 displays payroll calculations 226 in on-demand payroll interface 206. On-demand payroll interface 206 payroll calculations 226 are displayed side-by-side with an associated payroll policy 210.

For example, on-demand payroll microservice 202 polls to Payroll input microservice 228 for a completed status of the requested payroll job. Once the request job is completed, on-demand payroll microservice 202 retrieves payroll calculations 226 from database 234. For example, on-demand payroll microservice 202 using appropriate API endpoint within one of the first set of micro-services 214, such as an API in payroll profile micro service 218 for retrieving pay statements, displays the calculation result amounts on the UI next to each of the policies entered, enabling user 204 to more quickly review and approve the unscheduled payment.

The micro service architecture of payroll processor 180 enables on-demand payroll processor 108 to calculate and display updated payroll calculations in near real-time, when user 204 makes changes to template 208, payroll policies 210, payroll information 212, and combinations thereof. For example, for a particular unscheduled payment, when on-demand payroll microservice 202 receives change to payroll policies 210, a change to the payroll information, 212, or combinations thereof, on-demand payroll micro service 202 populates the various data fields in the selected one of templates 208. On-demand payroll microservice 202 records the update to the using the object identifier previously created for the original request. On-demand payroll processor 108 re-determines payroll calculations 226 according to the received changes. On-demand payroll microservice 202 displays the updated calculations side-by-side with the received changes in on-demand payroll interface 206.

In the illustrative example, in response to receiving approval of the unscheduled payment from user 204, on-demand payroll microservice 202 submits the payroll calculations 226 to the second set of microservices 224 for processing of the unscheduled payment. On-demand payroll microservice 202 displays a confirmation of the payment processing when payment processing has finished.

For example, on-demand payroll interface 206 may include a control element enabling user 204 to approve payroll information and the associated calculations displayed there with. When user 204 interacts with the control element, such as by "clicking" a button in on-demand payroll interface 206, a REST call is made to payroll input micro service 228 to initiate a payment. On-demand payroll micro service 202 polls payroll input micro service 228 for status updates. When the unscheduled payment has been accepted, on-demand payroll interface 206. Displays a final confirmation page of the unscheduled payment, and another REST call is made to payroll output micro service 230 to initiate Company Total for YTD.

In one illustrative example, machine learning 114 can be used to tailor templates 208 to a particular organization based on changes to payroll policies 210 and payroll information 212. For example, when a change to payroll policies 210 indicated by a selected one of templates 208 is received, the change to the payroll policies 210 and payroll information 212 for the employee is modeled to identify correlations among dimensions of data and generalize rules for predicting policy selections. The modeling can take place within an application context of an employer of the employee. Based on the modeling, an updated template is generated within the application context of the employer.

Figure 3:
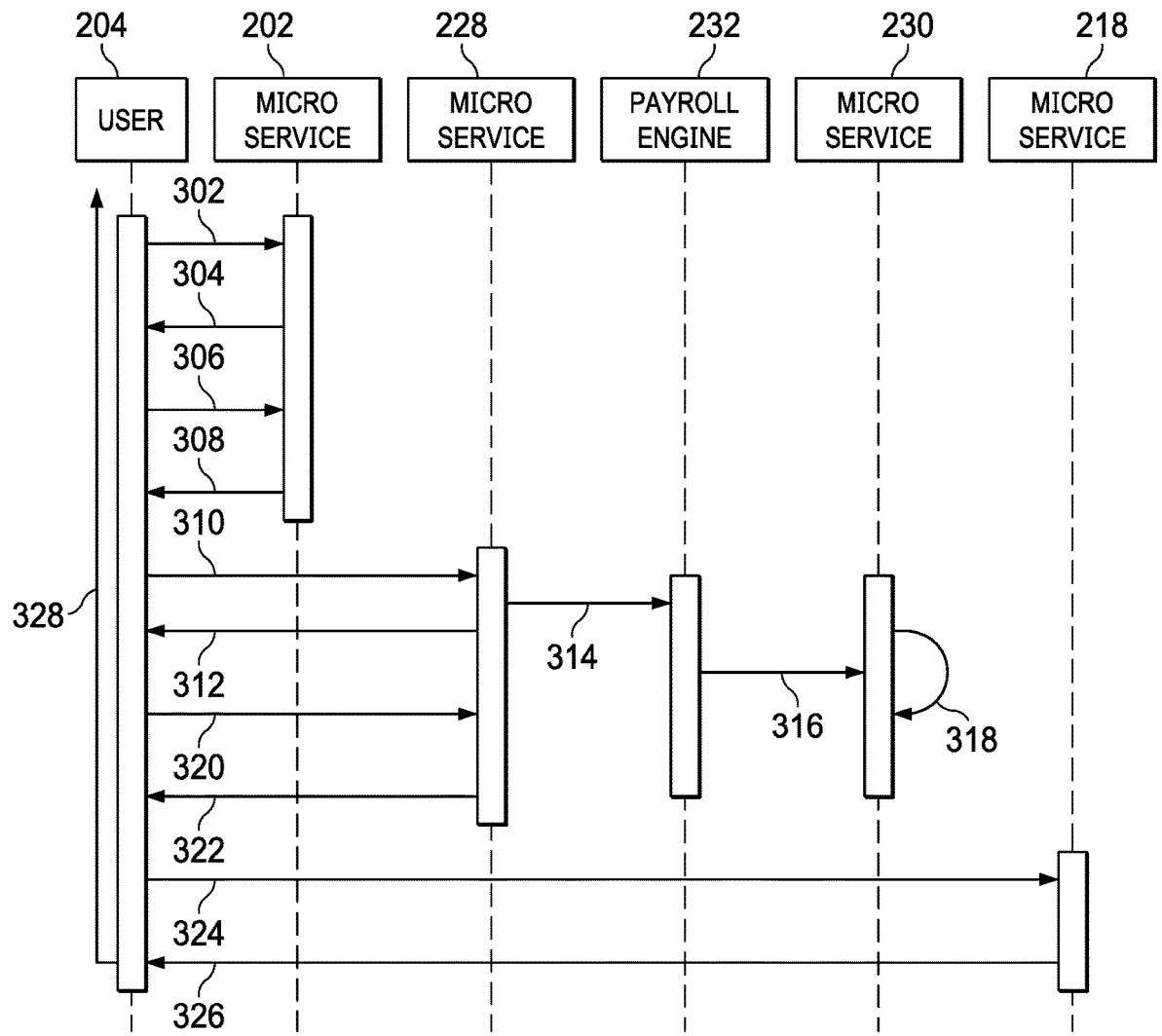
FIG. 3 is a dataflow for processing an on-demand payroll request in a microservice architecture in accordance with an illustrative embodiment.

FIG. 3 is a dataflow for processing an on-demand payroll request in a microservice architecture in accordance with an illustrative embodiment. The dataflow of FIG. 3 can implemented between one or more micro services in on-demand payroll micro service 108 of FIG. 2.

A user 204, using on-demand payroll interface 206, posts a record to micro service 202 to initiate an on-demand payment (302). After adding the record to a database, such as database 234 of FIG. 2, micro service 202 returns an associated identifier for the record (304). User 204 can put updates into an open records using the object identifier (306), with micro service 202 returning success after updating the record (308).

User 204 initiates the payroll calculations by calling micro service 228 (310). After inserting a job record into a corresponding table, micro service 228 puts a message into a queue 236 for payroll input processor 238, shown in FIG. 2, and returns a job identifier to the user 204 (312).

Micro service 228 sends a request for calculation previews to payroll engine 232 (314). Once processed, payroll engine 232 posts the output calculation result to micro service 230 (316). Micro service 230 saves the output calculation result to a database, such as database 234 of FIG. 2 (318), and updates micro service 228 with a completed job status for the calculation preview job.

User 204, through on-demand payroll interface 206, polls micro service 228 for the status of payroll calculations (320). Once the calculations have been completed, micro service 228 returns the payroll job status to user 204 (322).

Once the payroll calculations are completed, User 204, through on-demand payroll interface 206, calls micro service 218 to get the calculation results (324). The calculation results can be displayed on the user interface against each payroll policy that affects the results, as well as totals for earnings, deductions, fringe benefits, garnishments, and taxes.

Micro service 218 returns the pay statement data and calculation results (326), enabling on-demand payroll interface 206 to map policy inputs entered on the user interface with the calculation results. The display of calculation results, including earnings, deductions, and taxes, are updated on a tab out or refresh (328).

Figure 4:
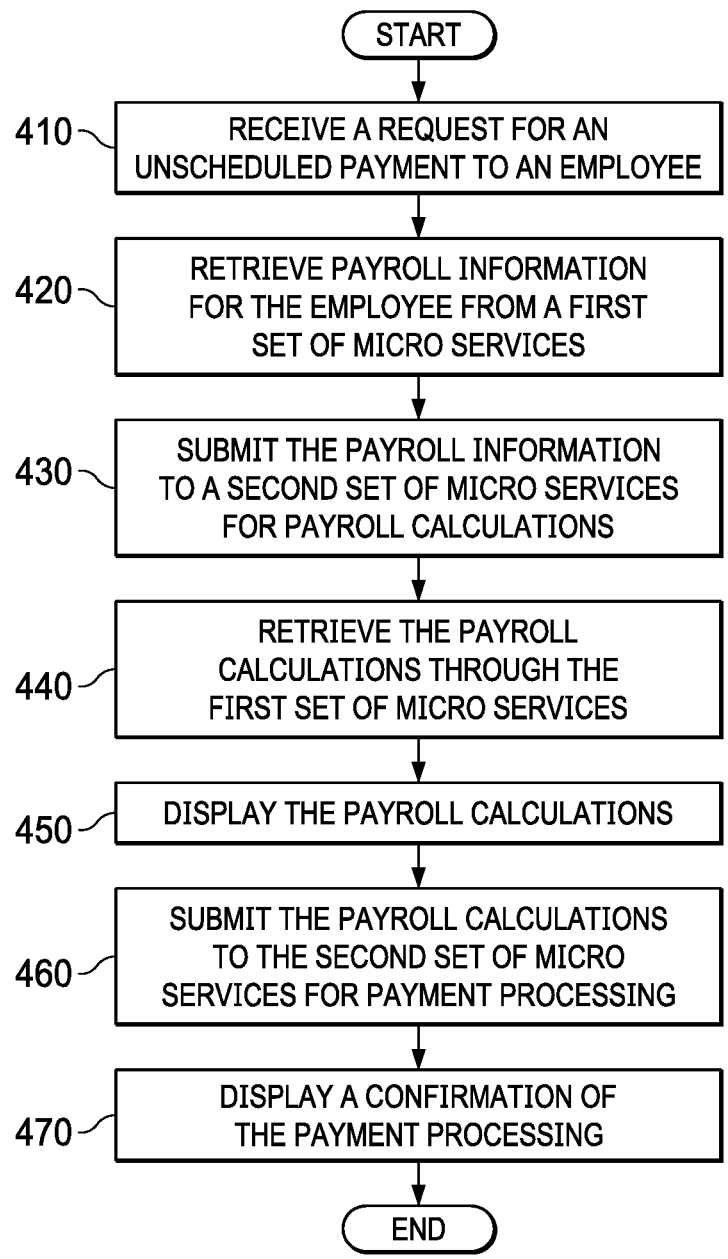
FIG. 4 is a flowchart of a process processing an on-demand payroll request in accordance with an illustrative embodiment.

With reference next to FIG. 4, a flowchart of a process processing an on-demand payroll request is depicted according to an illustrative example. The process of FIG. 4 can be a software process, implemented in a software component, such as in on-demand payroll processor 108 of FIG. 1, or more specifically in on-demand payroll micro service 202 of FIG. 2.

The process receives a request for an unscheduled payment to an employee (step 410). In one illustrative example, the request may include the designation of a template for the unscheduled payment.

The process retrieves payroll information for the employee from a first set of microservices (step 420). the first set of microservices can be first set of micro-services 214 of FIG. 2, and can include micro services such as, for example, a payroll schedule microservice, a payroll profile microservice, and a payroll policies microservice.

When the request includes a template, the template indicates payroll policies implemented for the unscheduled payment. The payroll information may be retrieved according to its designation within the payroll policies designated by the template. The payroll policies implemented in a template for the unscheduled payment are different than payroll policies implemented for regular payments processed according to a regular payroll schedule. The template can be, for example, one of templates 208 of FIG. 2, and can be selected from, for example, a bonus payment template, a payment upon termination template, a payment upon leave of absence template, and adjusted regular payment template, a back payment template, an additional payment template, or a commission payment template.

The process submits the payroll information to a second set of microservices for payroll calculations (step 430). The second set of micro-services can be second set of micro-services 224 of FIG. 2, and can include micro services such as, for example, a payroll input micro service and a payroll output micro service.

In response to completion of the payroll calculations, the process retrieves the payroll calculations through the first set of microservices (step 440), and displays the payroll calculations (step 450). The payroll calculations are displayed in near real-time, side-by-side with the associated payroll policies and payroll information.

Responsive to receiving approval of the unscheduled payment, the process submits the payroll calculations to the second set of microservices for payment processing (step 460), and displays a confirmation of the payment processing (step 470). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 5:
FIG. 5 is a first page of a graphical user interface for requesting an unscheduled payroll payment in accordance with an illustrative embodiment.

With reference next to FIG. 5, a first page of a graphical user interface for requesting an unscheduled payroll payment is depicted according to an illustrative example. Page 500 is one example of a graphical user interface that can be implemented in on-demand payroll interface 206 of FIG. 2. A user, such as user 204 of FIG. 2, can request an unscheduled payment by interacting with the various graphical features displayed on page 500.

Figure 6:
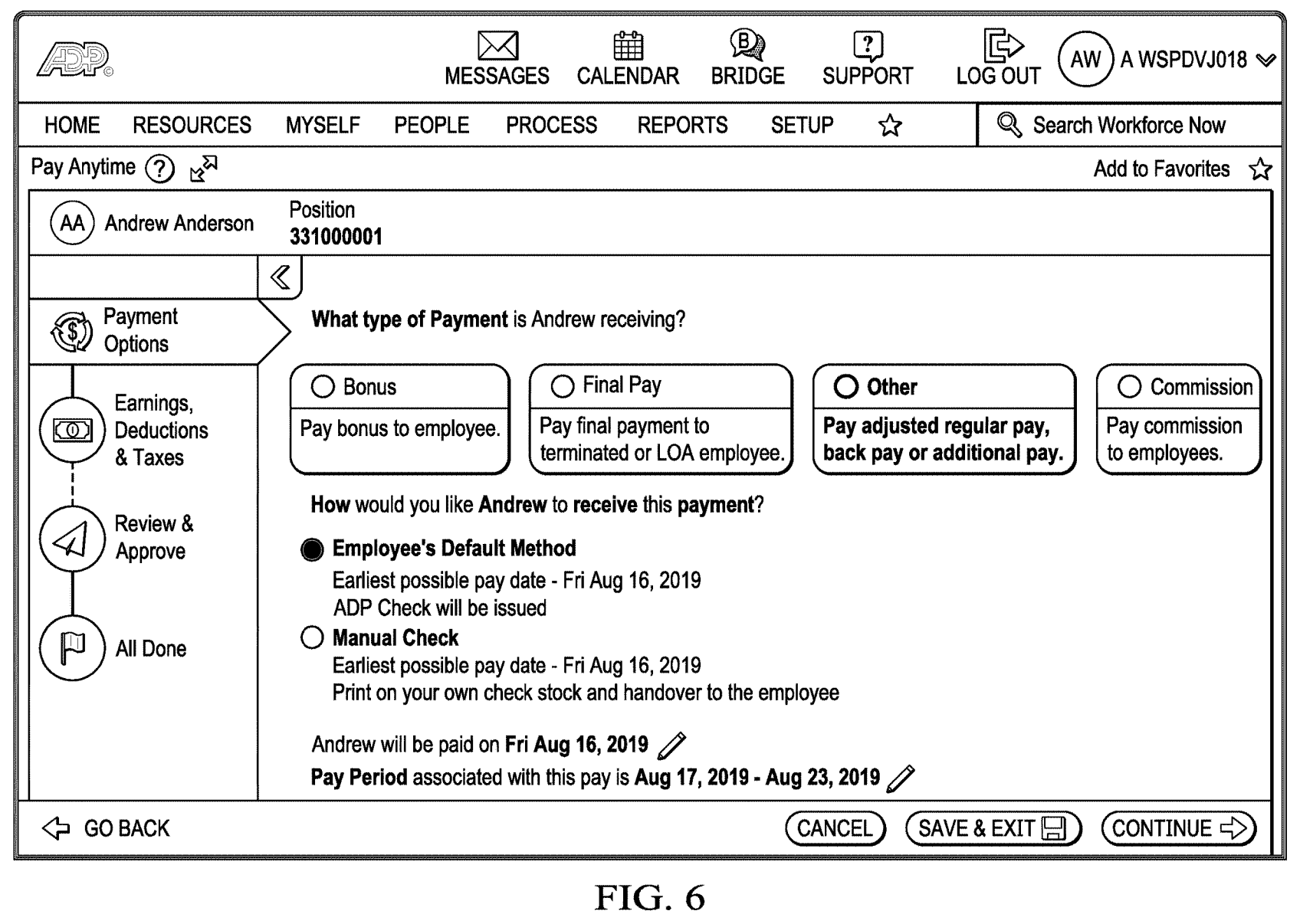

With reference next to FIG. 6, a second page of a graphical user interface for requesting an unscheduled payroll payment is depicted according to an illustrative example. Page 600 is one example of a graphical user interface that can be implemented in on-demand payroll interface 206 of FIG. 2. From page 600, a user, such as user 204 of FIG. 2 can select from different templates and delivery options for the unscheduled payment request by interacting with the various graphical features displayed on page 600.

With reference next to FIGS. 7A-7C, a third page of a graphical user interface for requesting an unscheduled payroll payment is depicted according to an illustrative example. Page 700 is one example of a graphical user interface that can be implemented in on-demand payroll interface 206 of FIG. 2. Page 700 displays the payroll policies and payroll information associated with a selected template. Additionally, page 700 displays payroll calculations side-by-side with the payroll policies and payroll information. From page 700, a user, such as user 204 of FIG. 2, can submit changes to the different payroll policies and information, as well as review payroll calculations for the requested unscheduled payment.

With reference next to FIGS. 8A-8B, a fourth page of a graphical user interface for requesting an unscheduled payroll payment is depicted according to an illustrative example. Page 800 is one example of a graphical user interface that can be implemented in on-demand payroll interface 206 of FIG. 2. From page 800, a user, such as user 204 of FIG. 2, can review the various payroll policies and information for the unscheduled payment, and approve the payment for on-demand payroll processing.

Figure 9:
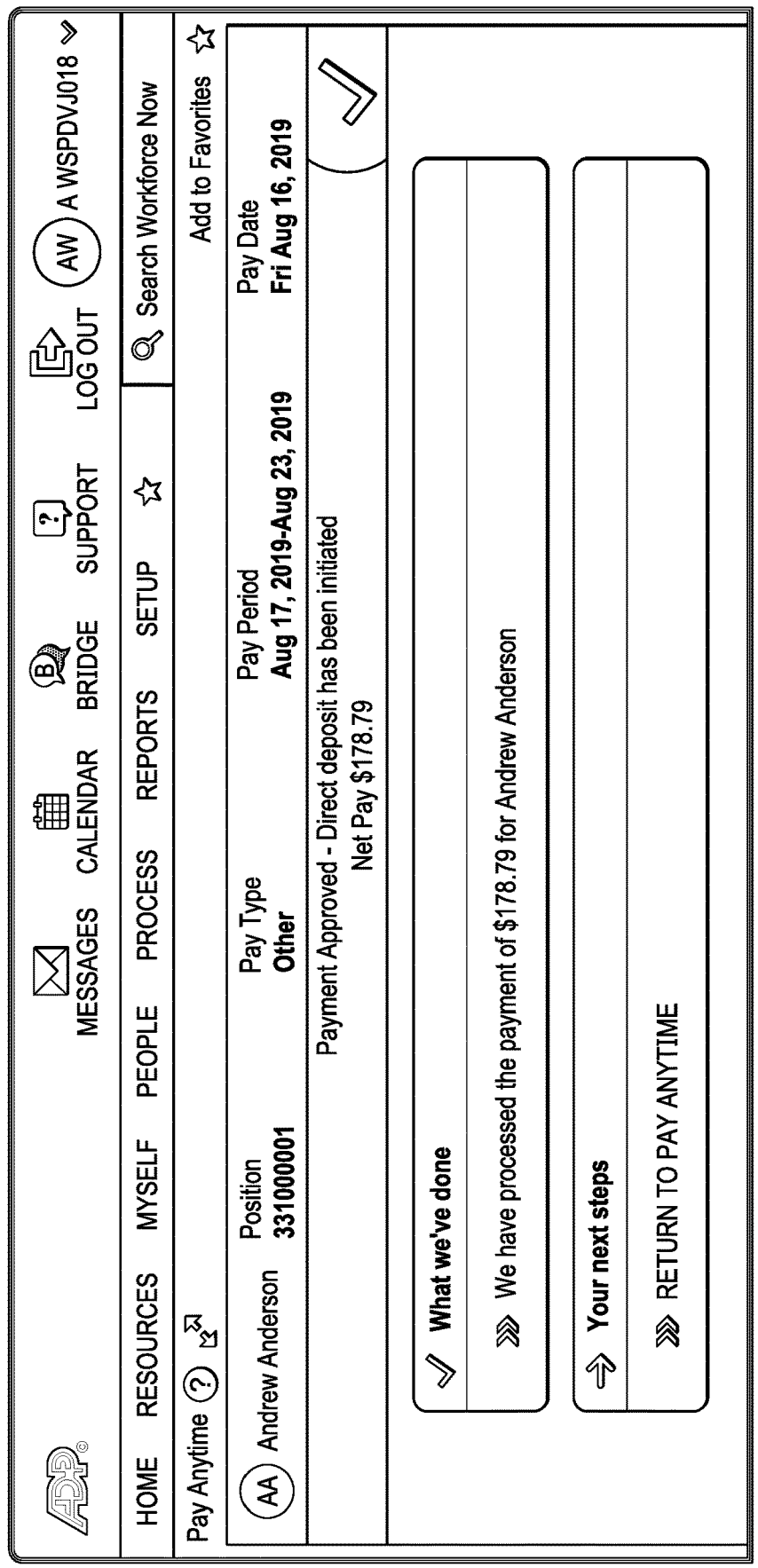
FIG. 9 is a fifth page of a graphical user interface for requesting an unscheduled payroll payment in accordance with an illustrative embodiment.

With reference next to FIG. 9, a fifth page of a graphical user interface for requesting an unscheduled payroll payment is depicted according to an illustrative example. Page 900 is one example of a graphical user interface that can be implemented in on-demand payroll interface 206 of FIG. 2. Page 900 displays a confirmation that the unscheduled payment has been processed.

Figure 10:
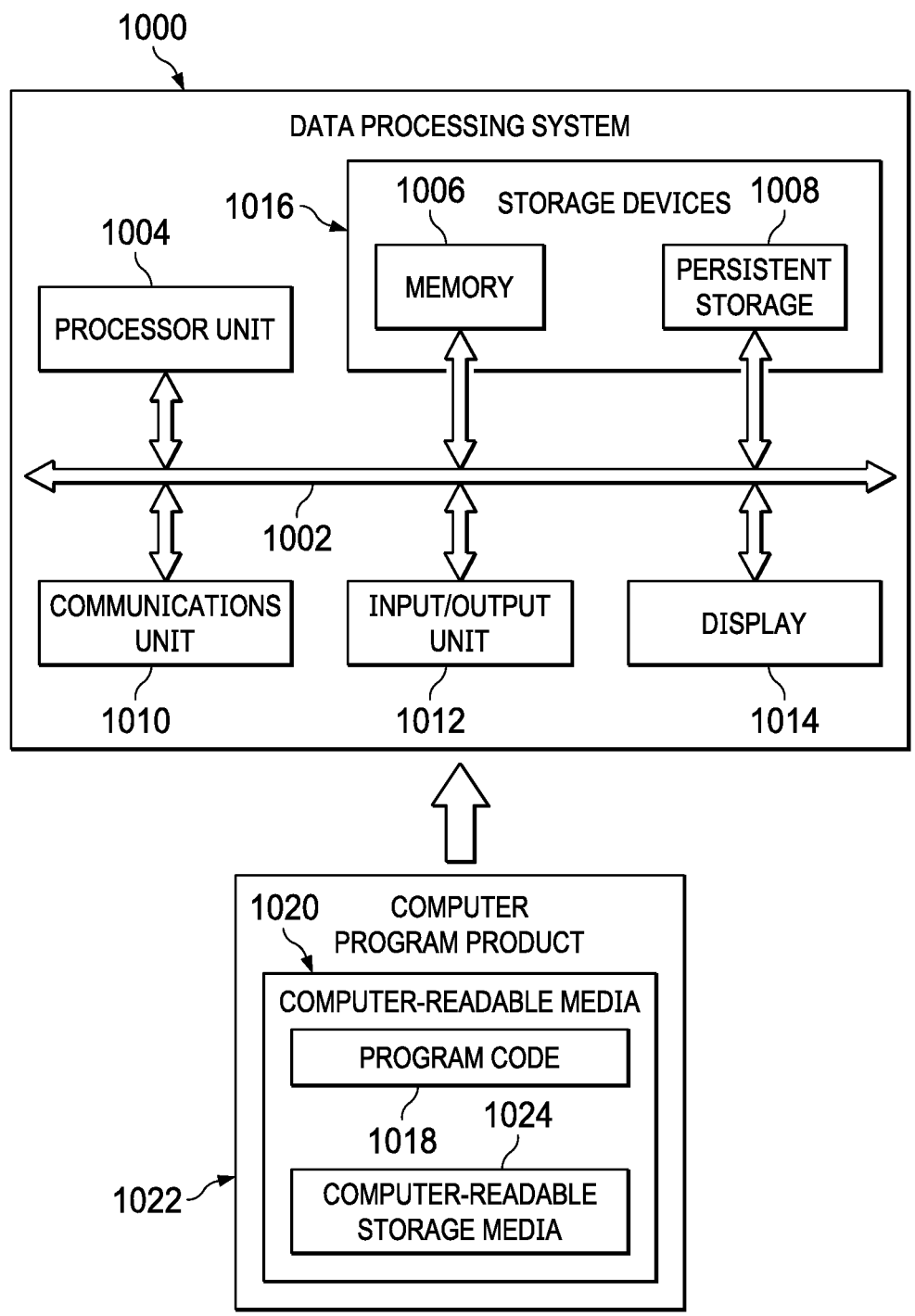
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement one or more data processing systems in computer system 106. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card that connects data processing system 1000 to an external computer or external storage device via a network, for example, the Internet, a local area network, a wide area network and/or a wireless network.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018. Computer-readable storage media 1024 may be, for example, but is not limited to, an electronic storage device, a magnetic storage device, an optical storage device, an electromagnetic storage device, a semiconductor storage device, or any suitable combination of the foregoing.

The term "non-transitory" or "tangible", as used herein, is a limitation of the medium itself (i.e., tangible, not a signal) as opposed to a limitation on data storage persistency (e.g., RAM vs. ROM). Computer-readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program code 1018 can be located in computer-readable media 1020 in the form of a single storage device or system. In another example, program code 1018 can be located in computer-readable media 1020 that is distributed in multiple data processing systems. In other words, some instructions in program code 1018 can be located in one data processing system while other instructions in in program code 1018 can be located in one data processing system. For example, a portion of program code 1018 can be located in computer-readable media 1020 in a server computer while another portion of program code 1018 can be located in computer-readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, illustrative embodiments provide a method, apparatus, system, and computer program product that processes an on-demand payroll request. In one illustrative example, an on-demand payroll microservice receives a request for an unscheduled payroll to an employee. The on-demand payroll microservice retrieves payroll information for the employee from a first set of microservices. The on-demand payroll microservice submits the payroll information to a second set of microservices for payroll calculations. In response to the second set of microservices completing the payroll calculations, the on-demand payroll microservice retrieves the payroll calculations through the first set of microservices. The on-demand payroll microservice displays the payroll calculations. In response to receiving approval of the unscheduled payroll, the on-demand payroll microservice submits the payroll calculations to the second set of microservices for payroll processing. In response to the second set of microservices completing the payroll processing, the on-demand payroll microservice displays a confirmation of the payroll processing.

In one illustrative example, one or more solutions are present that overcome an issue with providing on-demand payroll payment to an employee anytime without waiting for the regular scheduled payroll to be run. As a result, one or more solutions may provide an effect of enabling the faster payment processing of unscheduled payroll payments as compared to current techniques of traditional batch-based payroll systems. Thus, the illustrative examples can provide real-time payroll calculation that take into account different payroll policies that can be implicated by different types of on-demand payments and the processing rules to implement those policies.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, comprising:
  receiving, by a data processing system comprising one or more processors, coupled with memory, a request for at least one payment of a plurality of payments at an instance deviating from a frequency of the plurality of payments, the request comprising one or more frameworks for unscheduled payment, wherein the one or more frameworks are selected from a plurality of frameworks for implementing a plurality of unscheduled payroll policies for the unscheduled payment, and wherein the plurality of unscheduled payroll policies are for on-demand payment outside of a scheduled cycle associated with regular payroll policies for scheduled payment;

retrieving, by the data processing system based on the one or more frameworks selected from the plurality of frameworks, payroll information corresponding to the request from a first microservice to a first framework according to a first payroll policy of the plurality of unscheduled payroll policies and a second framework according to a second payroll policy of the plurality of unscheduled payroll policies associated with the request;

generating, by the data processing system, based on the payroll information, the first framework according to the first payroll policy and the second framework according to the second payroll policy, wherein the first framework and the second framework are for implementing the first payroll policy and the second payroll policy, respectively, for the unscheduled payment, and wherein the first framework and the second framework are dynamically generated based on changes to the first payroll policy and the second payroll policy, respectively;

interfacing, by the data processing system, with a second microservice to process the payroll information associated with the first framework and the second framework, wherein the second microservice is different from the first microservice;

performing, by the data processing system using the processed payroll information of the second microservice, payroll calculations according to the first payroll policy associated with the first framework and the second payroll policy associated with the second framework, wherein the payroll calculations associated with the first payroll policy differ from the second payroll policy;

retrieving, by the data processing system responsive to performing the payroll calculations, the payroll calculations through the first microservice;

displaying, by the data processing system on a display device, the payroll calculations with the first payroll policy, the second payroll policy, and the payroll information;

receiving, by the data processing system on the display device, a change to at least one of the first payroll policy associated with the first framework or the second payroll policy associated with the second framework for the unscheduled payment;

generating, by the data processing system in response to receiving the change, a machine learning model using at least one of the first payroll policy or the second payroll policy and the change to at least one of the first payroll policy or the second payroll policy to recognize patterns associated with at least one of the first framework or the second framework;

identifying, by the data processing system using the machine learning model generated according to the change, the patterns between the payroll information, at least one of the first payroll policy or the second payroll policy, and the request;

generating, by the data processing system, at least one of an updated first framework or an updated second framework for the unscheduled payment according to the patterns identified by the machine learning model, wherein the updated first framework is generated based on the first framework and the updated second framework is generated based on the second framework;

displaying, by the data processing system in response to updating at least one of the first framework or the second framework, the first framework and the second framework;

determining, by the data processing system using the machine learning model, at least one modification to at least one of the first microservice or the second microservice according to the patterns associated with at least one of the first framework or the second framework;

modifying, by the data processing system, according to the at least one modification determined by the machine learning model, at least one of the first microservice or the second microservice; and redeploying, by the data processing system in response to the at least one modification, at least one of the first microservice or the second microservice modified using the machine learning model, wherein the at least one modification and redeployment are triggered by at least one of the request for the at least one payment or the change to at least one of the first payroll policy or the second payroll policy for the unscheduled payment.

2. The method of claim 1, comprising:
determining, by the data processing system, that a change to the first framework has been received;
populating, by the data processing system, the first framework with new payroll information related to the change to the first framework; and
updating, by the data processing system, the payroll calculations based on the new payroll information.

3. The method of claim 1, comprising:
receiving, by the data processing system from a user interface, an approval of the request;
submitting, by the data processing system, the payroll calculations to the second microservice to process the request; and
displaying, by the data processing system, an output based on the processed request.

4. The method of claim 1, comprising:
generating, by the data processing system using the machine learning model, a set of rules for predicting policies to associate with requests.

5. The method of claim 1, comprising:
mapping, by the data processing system, the first payroll policy to the payroll calculations; and
displaying, by the data processing system, an output based on the payroll calculations.

6. The method of claim 1, comprising displaying, by the data processing system, the updated first framework with the first payroll policy and the payroll information.

7. The method of claim 1, wherein the first framework comprises at least one of a bonus payment framework, a payment upon termination framework, a payment upon leave of absence framework, an additional payment framework, or a commission payment template-framework.

8. The method of claim 1, wherein interfacing with the second microservice to process the payroll information comprises queuing payroll information according to the frequency of the plurality of payments.

9. The method of claim 1, wherein the second microservice comprises a payroll input microservice and a payroll output microservice.

10. The method of claim 1, wherein displaying the payroll calculations comprises:
generating, subsequent to retrieving the payroll calculations from the second microservice through the first microservice, a graphical user interface to display at least the payroll calculations; and updating the graphical user interface in response to an update to the payroll calculations.

11. A system, comprising:

one or more processors, coupled with memory, to:

receive a request for at least one payment of a plurality of payments at an instance deviating from a frequency of the plurality of payments, the request comprising one or more frameworks for unscheduled payment, wherein the one or more frameworks are selected from a plurality of frameworks for implementing a plurality of unscheduled payroll policies for the unscheduled payment, and wherein the plurality of unscheduled payroll policies are for on-demand payment outside of a scheduled cycle associated with regular payroll policies for scheduled payment;

retrieve, based on the one or more frameworks selected from the plurality of frameworks, payroll information corresponding to the request from a first microservice to a first framework according to a first payroll policy of the plurality of unscheduled payroll policies and a second framework according to a second payroll policy of the plurality of unscheduled payroll policies associated with the request;

generate, based on the payroll information, the first framework according to the first payroll policy and the second framework according to the second payroll policy, wherein the first framework and the second framework are for implementing the first payroll policy and the second payroll policy, respectively, for the unscheduled payment, and wherein the first framework and the second framework are dynamically generated based on changes to the first payroll policy and the second payroll policy, respectively;

interface with a second microservice to process the payroll information associated with the first framework and the second framework, wherein the second microservice is different from the first microservice;

perform, using the processed payroll information of the second microservice, payroll calculations according to the first payroll policy associated with the first framework and the second payroll policy associated with the second framework, wherein the payroll calculations associated with the first payroll policy differ from the second payroll policy;

retrieve, responsive to performing the payroll calculations, the payroll calculations through the first microservice;

display, on a display device, the payroll calculations with the first payroll policy, the second payroll policy and the payroll information;

receive, by the display device, a change to at least one of the first payroll policy associated with the first framework or the second payroll policy associated with the second framework for the unscheduled payment;

generate, in response to receiving the change, a machine learning model using at least one of the first payroll policy or the second payroll policy and the change to at least one of the first payroll policy or the second payroll policy to recognize patterns associated with at least one of the first framework or the second framework;

identify, using the machine learning model generated according to the change, the patterns between the payroll information, at least one of the first payroll policy or the second payroll policy, and the request;

generate at least one of an updated first framework or an updated second framework for the unscheduled payment according to the patterns identified by the machine learning model, wherein the updated first framework is generated based on the first framework and the updated second framework is generated based on the second framework;

display, in response to updating at least one of the first framework or the second framework, the first framework and the second framework;

determine, using the machine learning model, at least one modification to at least one of the first microservice or the second microservice according to the patterns associated with at least one of the first framework or the second framework;

modify, according to the at least one modification determined by the machine learning model, at least one of the first microservice or the second microservice; and redeploy, in response to the at least one modification, at least one of the first microservice or the second microservice modified according using the machine learning model, wherein the at least one modification and redeployment are triggered by at least one of the request for the at least one payment or the change to at least one of the first payroll policy or the second payroll policy for the unscheduled payment.

12. The system of claim 11, comprising the one or more processors to:

determine that a change to the first framework has been received;

populate the first framework with new payroll information related to the change to the first framework; and update the payroll calculations based on the new payroll information.

13. The system of claim 11, comprising the one or more processors to:

receive, from a user interface, an approval of the request;

submit the payroll calculations to the second microservice to process the request; and display an output based on the processed request.

14. The system of claim 11, comprising the one or more processors to:

generate, using the machine learning model, a set of rules for predicting policies to associate with requests.

15. The system of claim 11, comprising the one or more processors to:

map the first payroll policy to the payroll calculations; and display an output based on the payroll calculations.

16. The system of claim 11, comprising the one or more processors to display the updated first framework with the first payroll policy and the first payroll information.

17. The system of claim 11, wherein the first framework comprises at least one of a bonus payment framework, a payment upon termination framework, a payment upon leave of absence framework, an additional payment framework, or a commission payment framework.

18. The system of claim 11, comprising the one or more processors to interface with the second microservice to process the payroll information comprises queuing payroll information according to the frequency of the plurality of payments.

19. A non-transitory computer-readable medium with instructions embodied thereon, the instructions to cause one or more processors to:

receive a request for at least one payment of a plurality of payments at an instance deviating from a frequency of the plurality of payments, the request comprising one or more frameworks for unscheduled payment, wherein the one or more frameworks are selected from a plurality of frameworks for implementing a plurality of unscheduled payroll policies for the unscheduled payment, and wherein the plurality of unscheduled payroll policies are for on-demand payment outside of a scheduled cycle associated with regular payroll policies for scheduled payment;

retrieve, based on the one or more frameworks selected from the plurality of frameworks, payroll information corresponding to the request from a first microservice to a first framework according to a first payroll policy of the plurality of unscheduled payroll policies and a second framework according to a second payroll policy of the plurality of unscheduled payroll policies associated with the request;

generate, based on the payroll information, the first framework according to the first payroll policy and the second framework according to the second payroll policy, wherein the first framework and the second framework are for implementing the first payroll policy and the second payroll policy, respectively, for the unscheduled payment, and wherein the first framework and the second framework are dynamically generated based on changes to the first payroll policy and the second payroll policy, respectively;

interface with a second microservice to process the payroll information associated with the first framework and the second framework, wherein the second microservice is different from the first microservice;

perform, using the processed payroll information of the second microservice, payroll calculations according to the first payroll policy associated with the first framework and the second payroll policy associated with the second framework, wherein the payroll calculations associated with the first payroll policy differ from the second payroll policy;

retrieve, responsive to performing the payroll calculations, the payroll calculations through the first microservice;

display, on a display device, the payroll calculations with the first payroll policy, the second payroll policy and the payroll information;

receive, by the display device, a change to at least one of the first payroll policy associated with the first framework or the second payroll policy associated with the second framework for the unscheduled payment;

generate, in response to receiving the change, a machine learning model using at least one of the first payroll policy or the second payroll policy and the change to at least one of the first payroll policy or the second payroll policy to recognize patterns associated with at least one of the first framework or the second framework;

identify, using the machine learning model generated according to the change, the patterns between the payroll information, at least one of the first payroll policy or the second payroll policy, and the request;

generate at least one of an updated first framework or an updated second framework for the unscheduled payment according to the patterns identified by the machine learning model, wherein the updated first framework is generated based on the first framework and the updated second framework is generated based on the second framework;

display, in response to updating at least one of the first framework or the second framework, the first framework and the second framework;

determine, using the machine learning model, at least one modification to at least one of the first microservice or the second microservice according to the patterns associated with at least one of the first framework or the second framework;

modify, according to the at least one modification determined by the machine learning model, at least one of the first microservice or the second microservice; and redeploy, in response to the at least one modification, at least one of the first microservice or the second microservice modified according using the machine learning model, wherein the at least one modification and redeployment are triggered by at least one of the request for the at least one payment or the change to at least one of the first payroll policy or the second payroll policy for the unscheduled payment.

20. The non-transitory computer-readable medium of claim 19, comprising instructions to cause the one or more processors to:

generate, using the machine learning model, a set of rules for predicting policies to associate with requests.

* * * * *